July 28, 1959     M. COGNIAT ET AL     2,896,452

FLOWMETER

Filed Jan. 23, 1958

INVENTORS.
Marcel Cogniat
Michel de Fromont
George Serratrice
BY
Webb, Mackey & Burden
THEIR ATTORNEYS

United States Patent Office

2,896,452
Patented July 28, 1959

2,896,452

FLOWMETER

Marcel Cogniat, Pierre-Benite, and Michel de Fromont, and Georges Serratrice, Lyon, France, assignors to Societe d'Electro-Chimie, d'Electro-Metallurgie et des Acieries Electriques d'Ugine, Paris, France, a corporation of France Application January 23, 1958, Serial No. 710,674

Claims priority, application France January 24, 1957

7 Claims. (Cl. 73—204)

The present invention relates to flowmeters and more particularly to a flowmeter instrument adapted for the accurate measurement of small rates of flow of gas.

Flowmeters fall into several categories and in common these instruments must be designed with considerable sensitivity if used for small flow rates particularly gas. Being sensitive, they must be carefully calibrated and properly shielded and protected from outside disturbances and variations to which exposed and which inherently tend to reflect in their operation due to their extreme sensitivity.

This invention relates to improvements in a way of electrically measuring the gas flow and the present instrument employed has a concentrically arranged flow tube therein and utilizes a heat transfer principle in conjunction with the flow of a gas which is conducted through the tube. More specifically the flow tube is arranged in an isothermal enclosure in a manner to carry at its midportion a heating coil and at both sides of that coil two identical windings. The thermal principle which is involved is that the difference in resistance of these two unequally heated windings at the time of passage of gas flowing through the tube is proportional to the flow for small values of gas flow. The range of flows contemplated is of the order from 200 cubic centimeters per hour to a few liters per hour and, within that range and with gas circulation in one direction only, the heat unbalance between the windings depends expressly on how active that circulation is.

As above indicated, careful calibration is necessary for measuring small flows and there is considerable difficulty attached to accurately arranging the winding on one side of the heating coil so as to be identical with and electrically symmetrical to the other of the two windings. Another difficulty arises in accurately locating the heating coil between those two windings to insure thermal symmetry therebetween which obviously results in equal resistance readings with zero gas flow. A further difficulty comes in equally accurately positioning the tube axially in the isothermal enclosure in which it is arranged so as to prevent thermal dissymmetry within the interior thereof.

According to one feature of this invention, an outside container is provided so as to surround the isothermal enclosure and thus protect it from external disturbances but there then arises the further difficulty attached to supporting the isothermal enclosure within the container in an accurate manner to preserve the thermal symmetry desired and at the same time shield the sensitivity to the proper extent.

The present flowmeter device materially reduces or largely eliminates the foregoing difficulties, through the provision of a slidably mounted carrier or spool which carries the heating coil for proper adjustment and through the further provision of properly machined end members which when associated with the isothermal enclosure form end walls therefor. More specifically these end wall members support the flow tube at its opposite end portions and are machined with one set of bearing surfaces on which the body of the isothermal enclosure is initially axially adjustable to insure accurate longitudinal positioning of the flow tube within the interior thereof. Another set of bearing surfaces machined on the end wall members engages the end closure means of the outside container referred to enable the isothermal enclosure to be adjustably positioned at the right point in the interior of the hollow container.

According to a further feature of the present invention, the outside container referred to is sealed airtight by means of its end closures to provide a dead air space surrounding the isothermal enclosure and the container has a bellows configuration along a portion of the length thereof to provide a sealed expansion joint enabling it to conform without leakage to the changes of length of the isothermal enclosure due to its thermal expansion and contraction.

Further features and advantages will either be specifically pointed out or become apparent when for a better understanding of the invention reference is made to the following description taken in conjunction with the accompanying drawing which shows a preferred embodiment thereof.

Figure 1:
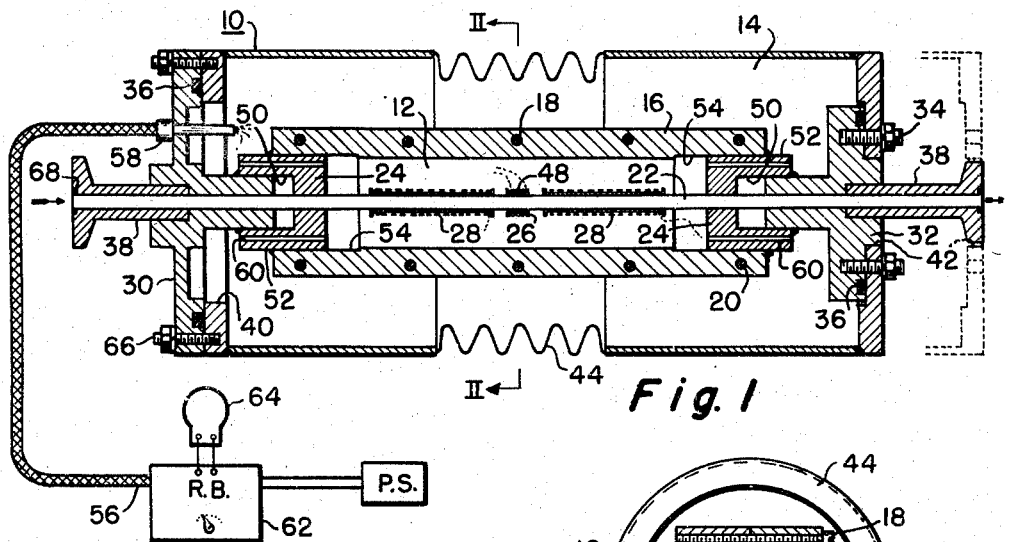
Figure 1 is a partially schematic diagram including a longitudinal sectional view of a flowmeter device embodying the instant invention.
Figure 2:
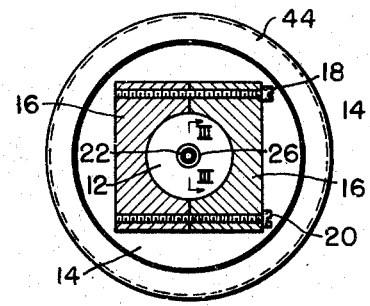
Figure 2 is a transverse sectional view along lines II—II of the device of Figure 1.

In more particular reference to the drawing, a flowmeter device 10 is illustrated formed of a pair of coaxial containers arranged one within another to form a housing and together defining an isothermal inner chamber 12 and a sealed outer chamber 14, each of which is of generally annular shape. A copper body of considerable mass forms an enclosing container for the isothermal chamber 12 consisting of a pair of metal halves 16 which have semi-cylindrical interiors and which produce a rectangular block shape on the outside when secured together by an upper and lower series of bolts 18 and 20.

A gas flow tube 22 has its midportion supported concentrically between the two halves 16 and the supporting portions of this tube pass through body mounting members 24 which form the end walls of the chamber 12 and which are accurately bored at the hub to insure good thermal contact at the points of issue of the tube 22. The tube 22 is a thin walled metal tube having an unrestricted interior of uniform diameter thus defining a smooth conduit for a flow of gas to be measured and having a flow direction as indicated by the gas stream arrows. At the midportion, the tube 22 carries an electrical heater 26 which is straddled by two identical windings 28 formed by wrapping an individual length of electrically insulated platinum wire in helical formation one at each side of the coil and fixed in place by means of a suitable varnish coating.

The housing of the device 10 has a pair of end closure members 30 and 32 which have differing outside diameters and the smaller one 32 of which carries a ring of studs 34. Similarly however they each carry an annular sealing ring 36 and further carry cylindrical inner extensions which are integral therewith and also outer extensions 38 which are separate metal parts made rigid therewith and forming reinforcements for the ends of the tube 22.

The outside of the housing of the device 10 comprises a cylinder having attachment flanges presenting large and small openings 40 and 42 at the respective ends and consisting of tubular body halves and an intervening bellows 44 of corrugated metal smoothly welded to the inner ends of the halves to form an air tight expansion joint therebetween.

Figure 3:
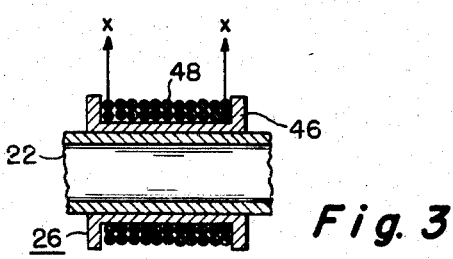
Figure 3 is a longitudinal sectional view taken along the section lines III—III of Figure 2.

The heater 26, according to Figure 3, includes a spool 46 and a coil heating element 48 formed by wrapping a length of resistance wire in layers thereabout. The coil element 48 has a pair of end terminals $xx$ for connection to a suitable power source as shown in Figure 1.

The spool 46 is made of metal of good thermal conductivity, preferably stainless steel, and has a smooth surfaced interior for good heat transfer contact with the tube 22, being machined so as to hold together therewith with a friction fit allowing for slidable adjustment in the axial direction. The tube 22 has a similar slidable engagement where it passes through the body mounting members 24 and their interfaces of contact form a tight joint, being machined so as to hold together with a friction fit.

The body mounting members 24 are machined with inner and outer bearing surfaces 50 and 52 respectively which are received on the integral extensions of the end closure members 30 and 32 and which fit within mating counterbores 54 formed in the copper body halves 16 adjacent each end of the isothermal chamber 12.

A cable connector 56 leading from the referred to power source P.S. illustrated in Figure 1 passes into the sealed chamber 14 in the device 10 through an insulator 58 which forms a gas tight joint therewith and which is located in the large end closure member 30. The individual electrical conductors into which the cable connector divides are led through appropriate orifices 60 formed in the mounting members 24 for connection to the respective platinum wire windings 28 and to the coil heating element 26. An interposed resistor box 62 which is connected to an external meter 64 contains internal resistors which in known way are included and adjusted in the load circuit with the platinum wire windings 28 to give accurate readings on the meter 64 by which with proper interpretation the gas flow rate is ascertained.

Platinum compared to the better metallic conductors offers relatively high resistance to current flow which is one desired characteristic herein and in addition it produces the characteristic of a suitably high temperature coefficient in the windings 28 made thereof. Thus, when current flow in the heater 26 causes the coiled wire element 48 thereof to heat, the platinum windings 28 disposed one on each side thereof function in a manner enabling the device 10 to operate as a highly accurate sensing head of flowmeter apparatus. The measurement of their ohmic difference is accurately made in accordance with conventional electrical practice, the principles of which are well known.

Figure 4:
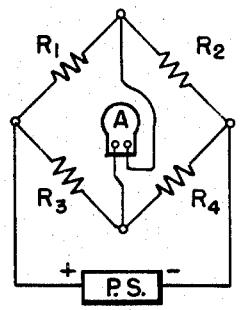
Figure 4 is a schematic diagram of a conventional Wheatstone bridge circuit.

For example, the ends of windings 28 can be wired into circuit so as to operate as the two unknown resistors in a conventional four-resistor Wheatstone bridge arrangement as illustrated in Figure 4, and thereafter adjustments are made in the usual way until the equal branches are in balance as evidenced by a zero reading on the meter A at the center. In this example the meter A connected between the output junctures of $R_{1-4}$ may consist of a galvanometer, a D.C. amplifier, or an automatic potentiometer; if it happens to be more convenient, a power source may be used which provides alternating current to the bridge although a D.C. power source P.S. as illustrated is preferred. The zero meter reading corresponds to zero gas flow where obviously the ohmic resistivity of the two coils 28 must be identical.

By calculation and by practical application, it is a proven fact that when the windings 28 start to differ from one another enough to create unbalance in the bridge circuit, their difference in resistance is a function proportional to and a measure of the magnitude of gas flow for small flow rates. The derivation of the particular relation stated forms no part of the present invention and is omitted in the interests of brevity. However, the formulation of this relation and the mathematical extension thereof to produce further refinements in the use of thermal flowmeters appear in copending Cogniat, et al. application Serial No. 717,173, filed February 24, 1958.

Following is an example of the physical dimensions and specifications of the embodiment of the invention illustrated;

Flow tube 22—twenty centimeters long x 3 millimeters O.D.

Coil element 48—2–3 layers;

Windings 28—single layer each 5–6 centimeters long.

During initial assembly of the device 10 of Figures 1 to 4 preceding, the heater 26 is manually slid to a position of approximate adjustment midway of the windings 28 and the body mounting members 24 are slid from the opposite ends of the tube 22 to a measured position thereon where they remain. The end closure members 30 and 32 are then installed with their inner extensions fitted in a position of approximate adjustment within the inner bearing surfaces 50 on the mounting members 24. The conductors from the connector cable 56 are then introduced through the orifices 60 in the mounting members 24 and suitable connections are made to the heater 26 and to the windings 28. Thereafter the halves 16 are bolted together in place and slid through limited movement axially to an approximate position of adjustment along the outer bearing surfaces 52 of the body mounting members.

The foregoing assembly is essentially unitary so as to retain its integrity when inserted from outside the outer container through the attachment flange having the large opening 40. It is axially advanced until it registers with the end flange having the small end opening 42 as shown in dotted lines in Figure 1 and thereafter the studs 34 pass into hold-down openings in the latter attachment flange and are held thereto by nuts to seal the joint. The other attachment flange having the large opening 40 carried a similar set of studs 66 and these studs are received in a set of hold-down openings in the end closure member 30 and held thereto by nuts so as to clamp the annular seal therebetween airtight.

Inasmuch as the opposite end of the tube 22 is encased in metal it is mechanically strengthened thereby so as to facilitate the operation when the inner structure is either brought into assembly with the outer housing of the device 10 or disassembled therefrom. The flow tube 22 is a brittle element and therefore of a fragile nature requiring this mechanical strengthening.

Final adjustment and checks of the device 10 are made with the power source and resistor box 62 properly operating to circulate current through both branches of the circuit and the heater 26 by minute movements is carefully brought to its point of final adjustment where it remains by friction assuring symmetrical heat distribution across and electrical symmetry as between the windings. The halves 16 of the copper body are bolted into place and brought into finally adjusted longitudinal position on the bearing surfaces on the end members 24 which are similarly brought into final longitudinal position with their inner surfaces 50 properly fitting at the proper point on the inner closure extensions. At that point welds are applied as shown affixed to the inner and outer bearing surfaces 50 and 52 to integrate the core structure and the whole structure is then inserted within the outer container and held thereto by the studs 34 and 66 and the associated nuts. Following completion of all adjustments each extremity of the tube 22 is secured by welds 68 or otherwise to the end of the reinforcing extension 38 at that end.

It is preferable that the closure members 30 and 32 be made of metal having relatively poor heat transfer characteristics whereas the mounting members 24 each consist of a copper body of considerable mass and high heat transfer characteristics to provide for an excellent heat conductivity path from the ends of the tube 22 into the copper body formed by the bolted together halves 16 thereabout. Thus, at the other bounds the chamber 12 is essentially isothermal in character due to presence of the uninterrupted inner walls of the copper mass.

Figure 5:
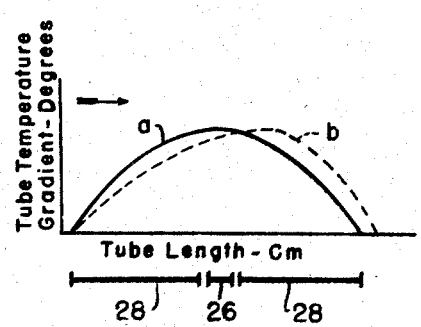
Figure 5 is an operational curve showing a shift of the tube temperature gradient due to the presence of gas flowing through the flowmeter device.

During operation where the circulation of the gas is in the direction shown by the arrow in Figure 5, the temperature gradient curve in the tube 22 changes from the form *a* representative of zero flow to a suitably shifted form *b*. An inspection of curve form *b* shows that a temperature drop occurs in the tube half which is upstream so as to cool the winding 28 thereabout and decrease its electrical resistance. However, the remaining half of the tube which is in contact with the heated gas downstream undergoes a rise in temperature to heat the platinum winding 28 thereabout and raise its resistance.

As already indicated, the resulting difference between these two resistances is proportional to the rate of gas flow and therefore as each electrical measurement is obtained from the apparatus it can be accurately interpreted in terms of actual gas flow for small flows. If the user provides in this apparatus proper output terminals and automatic circuits coupled thereto making a continuous reading in response to these electrical measurements, he can with slight modification insert an automatic recorder in circuit therewith. This modification enables the electrical readings of flow to be continuously recorded automatically for a permanent record. It is evident that the expansion joint formed by the bellows 44 enables the outer container to readily accommodate to changes in length of the rigid metal core housed therewithin resulting from its thermal expansion caused by the heater 26.

Variations within the spirit and scope of the invention described are equally comprehended by the foregoing description.

We claim:

1. In a meter device, a housing comprising a pair of containers arranged one within another with an annular space between, means including end closure members for the housing affixing the location of the ends of the inner container with respect to the outer container of the housing, flow tube means having end portions lodged in said end closure members and having a midportion carrying heat dissipating and heat sensing resistor elements within said inner container, and means providing an expansion joint in the walls of the outer container for accommodation of the latter to changes in length of said inner body due to thermal expansion.

2. In a meter device, a housing comprising a pair of containers arranged one within another with a dead-air space between, means including end closure members for the housing affixing the location of each end of the inner container with respect to the outer container of the housing, said end closure members being sealed airtight to said outer container, flow tube means having end portions lodged in said end closure members and having a midportion carrying heat dissipating and heat sensing resistor elements within said inner container, electrical connector means passing through sealed openings in the closure member at either end of said outer container for circulating current through said resistor element, and means providing an expansion joint in the walls of the outer container for accommodation of the latter to changes in length of said inner container due to thermal expansion.

3. A sensing head for flow meter apparatus comprising an outer container provided with end closure members at the opposite ends, a thermal flow tube therein having each end received in the end closure members at that end, a hollow inner body surrounding said thermal flow tube in spaced apart relation, a body mounting member connected between each end of said body and the adjacent end closure member of the container to form the end wall when associated with the former and provided with internal and external bearing surfaces machined thereon providing for movement of said body relative to said tube and relative to said end closure members from an initial approximate position, and means for securing said surfaces in the finally adjusted positions against relative movement.

4. A sensing head for flow meter apparatus comprising an outer container provided with end closure members at the opposite ends, a thermal flow tube therein having each end received in end closure members at that end, a hollow inner body surrounding said thermal flow tube in spaced apart relation, relatively shiftable heater and heat sensitive means carried by said tube within the hollow interior of said inner body and adjustable into final disposition for a precisely symmetrical distribution of heat along the tube, a body mounting member connected between each end of said body and the adjacent end of the closure member of the container to form the end walls when associated with the former and provided with internal and external bearing surfaces thereon providing for movement of said body relative to said tube and relative to said end closure members from an initial approximate position, means for securing said surfaces in final adjusted position against relative movement, and means for making fast each end of said tube in final position with respect to the closure member at that end.

5. A sensing head for flow meter apparatus comprising an outer container provided with end closure members at the opposite ends, a thermal flow tube therein having each end received in the end closure members at that end, a hollow inner body surrounding said thermal flow tube in spaced apart relation, a body mounting member connected between each end of said body and the adjacent end closure member of the container to form the end wall when associated with the former and provided with internal and external bearing surfaces machined thereon providing for movement of said body relative to said tube and relative to said end closure members from an initial approximate position, means for securing said surfaces in final adjusted position against relative movement, and individual conductor means passing through sealed opening means in the closure member at either end of the container and through the body mounting means at either end of the hollow bodies for connection to different ones of the heater and the heat sensitive means.

6. A sensing head for flow meter apparatus comprising an outer container provided with end closure members at the opposite ends, a thermal flow tube therein having each end received in the end closure members at that end, a hollow inner body surrounding said thermal flow tube in spaced apart relation, a body mounting member connected between each end of said body and the adjacent end closure member of the container to form the end wall when associated with the former and provided with internal and external bearing surfaces machined thereon providing for movement of said body relative to said tube and relative to said end closure members from an initial approximate position, means for securing said surfaces in final adjusted position against relative movement, and means providing an expansion joint in the walls of the outer container or accommodation of the latter to changes in the length of said inner body due to thermal expansion.

7. A sensing head for flow meter apparatus comprising an outer container provided with end closure members at the opposite ends, a thermal flow tube therein having each end received in the end closure members at that end, a hollow inner body surrounding said thermal flow tube in spaced apart relation, relatively shiftable heater and heat sensitive means carried by said tube within the hollow interior of the body and adjustable in final disposition for a precisely symmetrical distribution of heat along the tube, a body mounting member connected between each end of said body and the adjacent end closure member of the container to form the end walls when associated with the former and provided with internal and external bearing surfaces thereon providing for movement of said body relative to said tube and relative to said end closure members from an initial approximate position, means for securing said surfaces in final adjusted positions against relative movement, means for making fast each end of said tube in final position with respect to the closure member at that end, and individual conductor means passing through sealed opening means in the closure member at either end of the container and through the body mounting means at either end of the hollow body for connection to different ones of the heater and heat sensitive means.

References Cited in the file of this patent
UNITED STATES PATENTS

| | | |
|---|---|---|
| 2,193,763 | Hirsch et al. | Mar. 12, 1940 |
| 2,586,060 | Kronberger | Feb. 19, 1952 |
| 2,813,237 | Fluegel et al. | Nov. 12, 1957 |